United States Patent
Lu et al.

(10) Patent No.: US 12,151,711 B2
(45) Date of Patent: Nov. 26, 2024

(54) OFFLINE TRACKING SYSTEM FOR AUTONOMOUS VEHICLE CONTROL SYSTEMS

(71) Applicant: GM Cruise Holdings LLC, San Francisco, CA (US)

(72) Inventors: Jing Lu, San Francisco, CA (US); Zheng Qu, Bellevue, WA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 315 days.

(21) Appl. No.: 17/698,673

(22) Filed: Mar. 18, 2022

(65) Prior Publication Data

US 2023/0294736 A1 Sep. 21, 2023

(51) Int. Cl.
*B60W 60/00* (2020.01)

(52) U.S. Cl.
CPC .... *B60W 60/0016* (2020.02); *B60W 60/0017* (2020.02); *B60W 2420/403* (2013.01); *B60W 2420/408* (2024.01); *B60W 2554/4049* (2020.02)

(58) Field of Classification Search
CPC ......... B60W 60/0016; B60W 60/0017; B60W 2420/403; B60W 2420/408; B60W 2554/4049; G01S 13/931; G01S 17/006; G01S 17/931; G06V 20/58
See application file for complete search history.

(56) References Cited

U.S. PATENT DOCUMENTS

| | | | | |
|---|---|---|---|---|
| 11,640,170 | B1* | 5/2023 | Bagwell | B60W 40/04 701/23 |
| 2021/0001891 | A1* | 1/2021 | Majithia | B60W 60/0025 |
| 2021/0150280 | A1* | 5/2021 | White | G01C 21/3605 |
| 2022/0101053 | A1* | 3/2022 | Litvak | G06V 10/774 |
| 2023/0142674 | A1* | 5/2023 | Chebiyyam | G01S 13/931 342/70 |
| 2024/0005167 | A1* | 1/2024 | Yang | G06N 3/045 |
| 2024/0071095 | A1* | 2/2024 | Iizuka | B60W 50/0098 |

* cited by examiner

*Primary Examiner* — Thomas Ingram
(74) *Attorney, Agent, or Firm* — Michael DiCato

(57) ABSTRACT

Disclosed are systems, apparatuses, methods, and computer-readable media to autonomous driving vehicles and, in particular, for tracking objects in an environment that an autonomous vehicle (AV) is navigating. A method includes receiving environment data from at least one sensor in an AV control system mounted to the AV, the environment data including online tracking data that identifies at least one object within the environment data that is recorded at drive time; annotating the at least one object from the environment data that are incorrectly identified by the AV control system; executing an offline tracking engine to generate offline tracking data that tracks the objects over time in the environment data; and identifying safety gaps between the online tracking data and the offline tracking data.

16 Claims, 6 Drawing Sheets

OFFLINE TRACKING SYSTEM FOR AUTONOMOUS VEHICLE CONTROL SYSTEMS

TECHNICAL FIELD

The subject technology is related to autonomous driving vehicles and, in particular, to an offline tracking system for autonomous vehicle control systems.

BACKGROUND

Autonomous vehicles are vehicles having computers and control systems that perform driving and navigation tasks that are conventionally performed by a human driver. As autonomous vehicle technologies continue to advance, ride-sharing services will increasingly utilize autonomous vehicles to improve service efficiency and safety. However, autonomous vehicles will be required to perform many of the functions that are conventionally performed by human drivers, such as avoiding dangerous or difficult routes, and performing other navigation and routing tasks necessary to provide safe and efficient transportation. Such tasks may require the collection and processing of large quantities of data disposed on the autonomous vehicle.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 1:
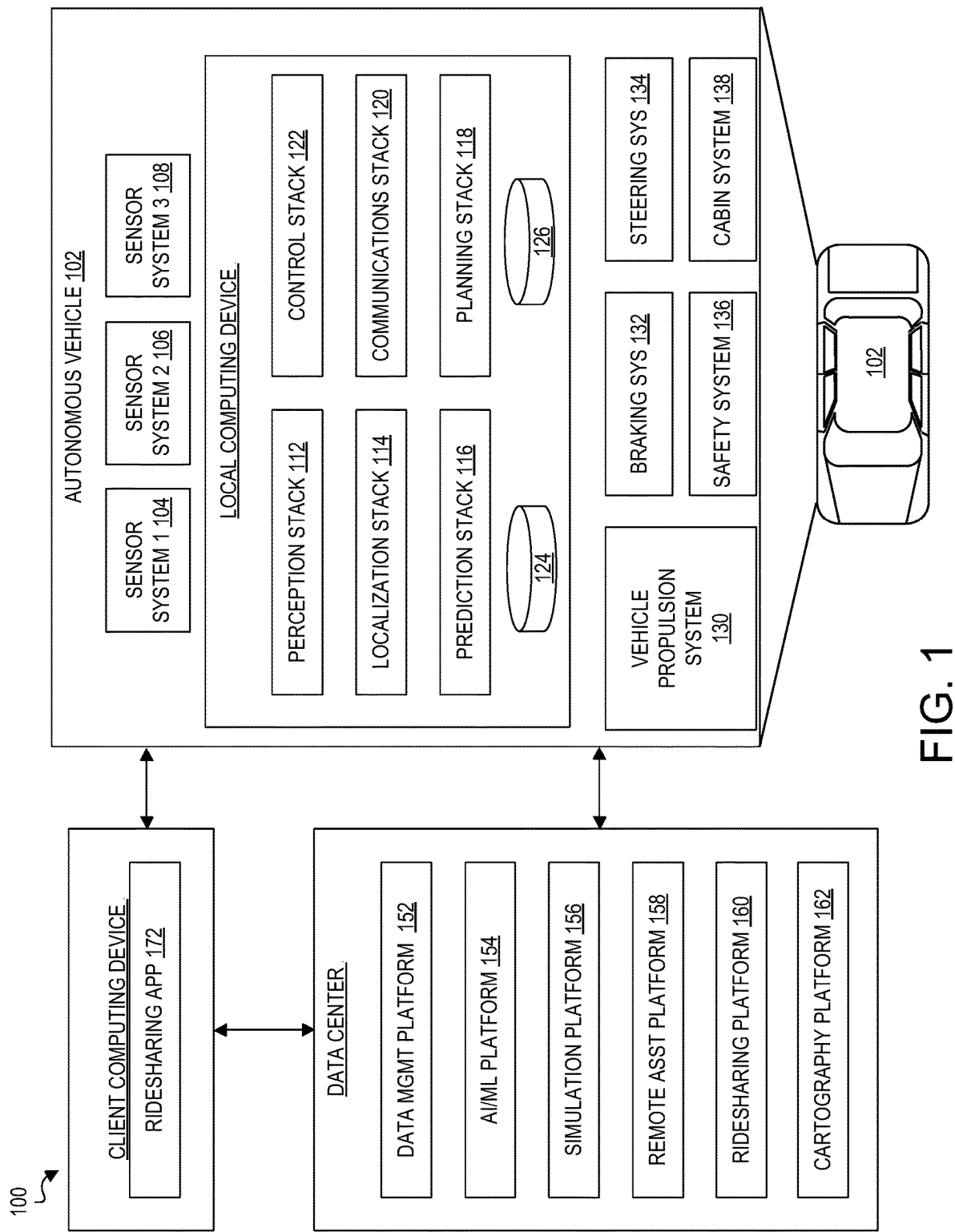
FIG. 1 illustrates an example of an autonomous vehicle (AV) management system according to an example of the instant disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

An autonomous vehicle (AV) includes a control system that controls various functions that are conventionally performed by a human driver, such as perception of objects in the environment, tracking of object movement in the environment, planning the movement of the AV based on object movement, and controlling navigation functions of the AV (e.g., acceleration, braking, turning, etc.). The AV control system has a limited compute budget and cannot use the most advanced algorithms due to latency constraints that should be observed to ensure that the AV does not inadvertently crash into an object in the environment. The functions (or modules, subsystems, devices, etc.) of the AV control systems therefore balance fidelity and latency to ensure that the AV accurately identifies objects to react to and does so in a timely fashion. Because of the limited budget, in some cases, the AV control system can produce phantom tracks, or tracking data of objects that do not exist (e.g., false positives) and cause the AV control system to account for non-existing objects. For example, the AV control system may identify an object as moving as the AV is turning, when in fact that object is stationary. The AV control system may also fail to identify moving objects earlier, which can reduce latency for conditions the AV should detect earlier and allow the AV suitable time to plan.

Systems, methods, and computer-readable media are disclosed for improving the tracking module of the AV control system. In some examples, the environmental data sensed by the AV control system, which may include the runtime data (or drivetime data) of the AV control system, may be used to validate the AV tracking module. The runtime data includes data produced by the AV control system that identifies a state of the AV control system (e.g., identified objects that are being tracked, planning data produced by the AV control system, etc.). In some aspects, an offline AV control system can include one or more functions of modules of the AV control system to replay the runtime data and identify safety gaps, or incorrect understandings of the environment that could raise safety concerns. The term online refers to a portion of a system that is executing in real time (e.g., an AV navigating in a city), and the term offline refers to a portion of a system that is a non-real time environment (e.g., an AV simulation) where latency and compute budget are not limited.

In some aspects, because the offline AV control system has nearly unlimited compute budget and time, the fidelity of the tracking system is improved and the replay of the environmental data can produce offline tracking data. The offline tracking data can be compared to the drivetime data (e.g., online or real-time data) that is produced by the AV when navigating the environment. By identifying safety gaps, or situations that are inappropriately labeled, the offline AV control system can be configured to produce data that can in turn be used to design test cases to improve online AV tracking modules. For example, the test cases can be used to generate simulations and train machine learning (ML) data models for tracking objects with a compute budget. Because the compute budget of the tracking system is known, ML data models can be specifically identified based on various constraints (e.g., the number of layers of the ML data model, the architecture of the ML data model, etc.) and trained to operate within the specific compute budget.

Example Embodiments

Figure 2:
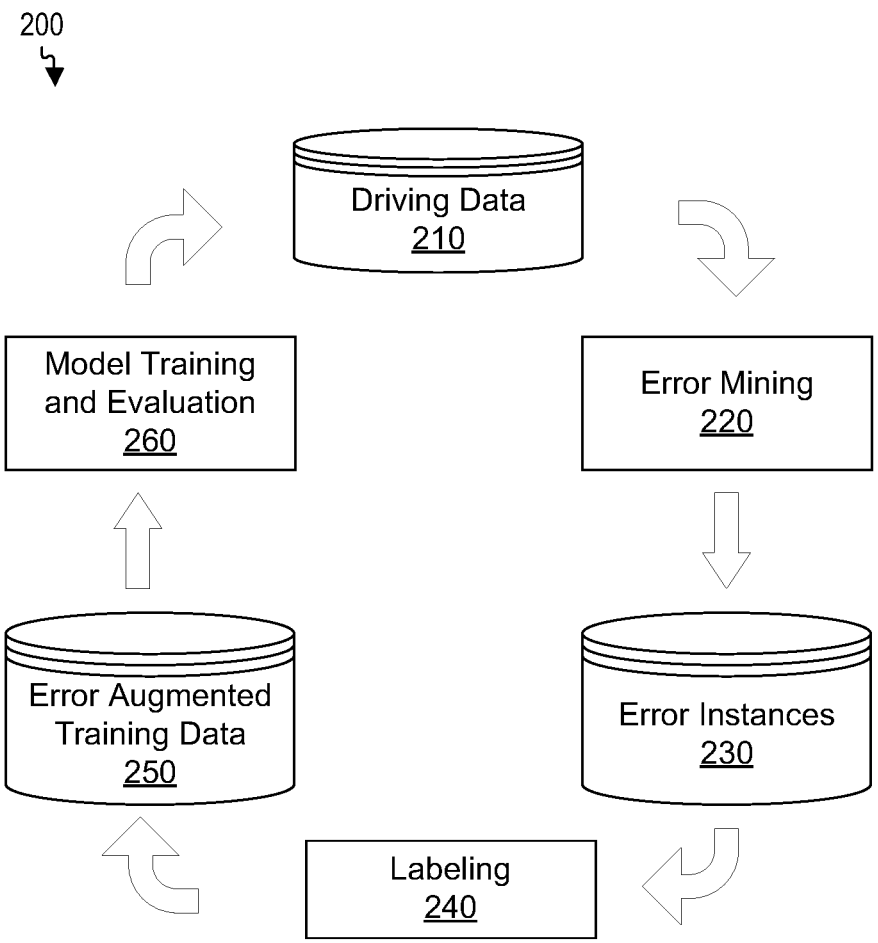
FIG. 2 illustrates an example diagram of a Continuous Learning Machine (CLM) for resolving uncommon scenarios in an AV according to an example of the instant disclosure.
Figure 5A:
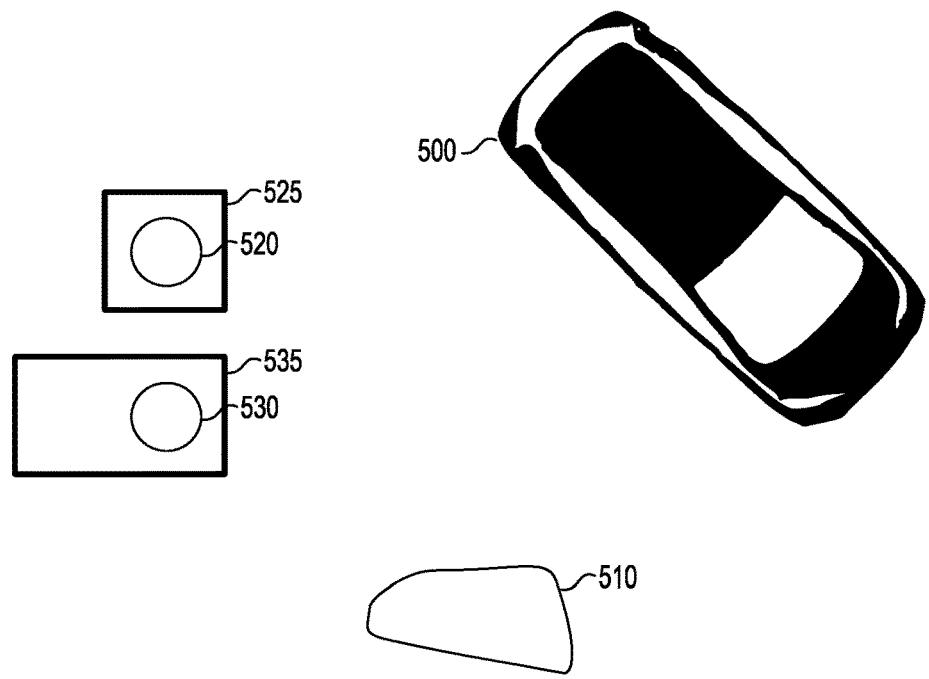
FIGS. 5A and 5B are visual illustrations of a user interface configured to display simulation or drivetime data from one or more sensors according to an example of the instant disclosure.
Figure 5B:
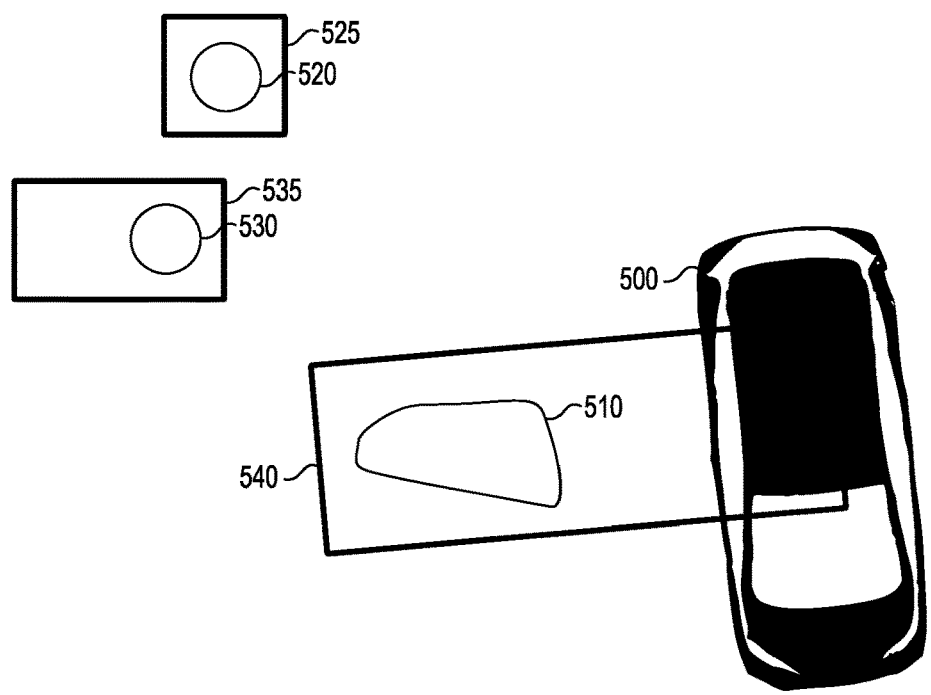
Figure 6:
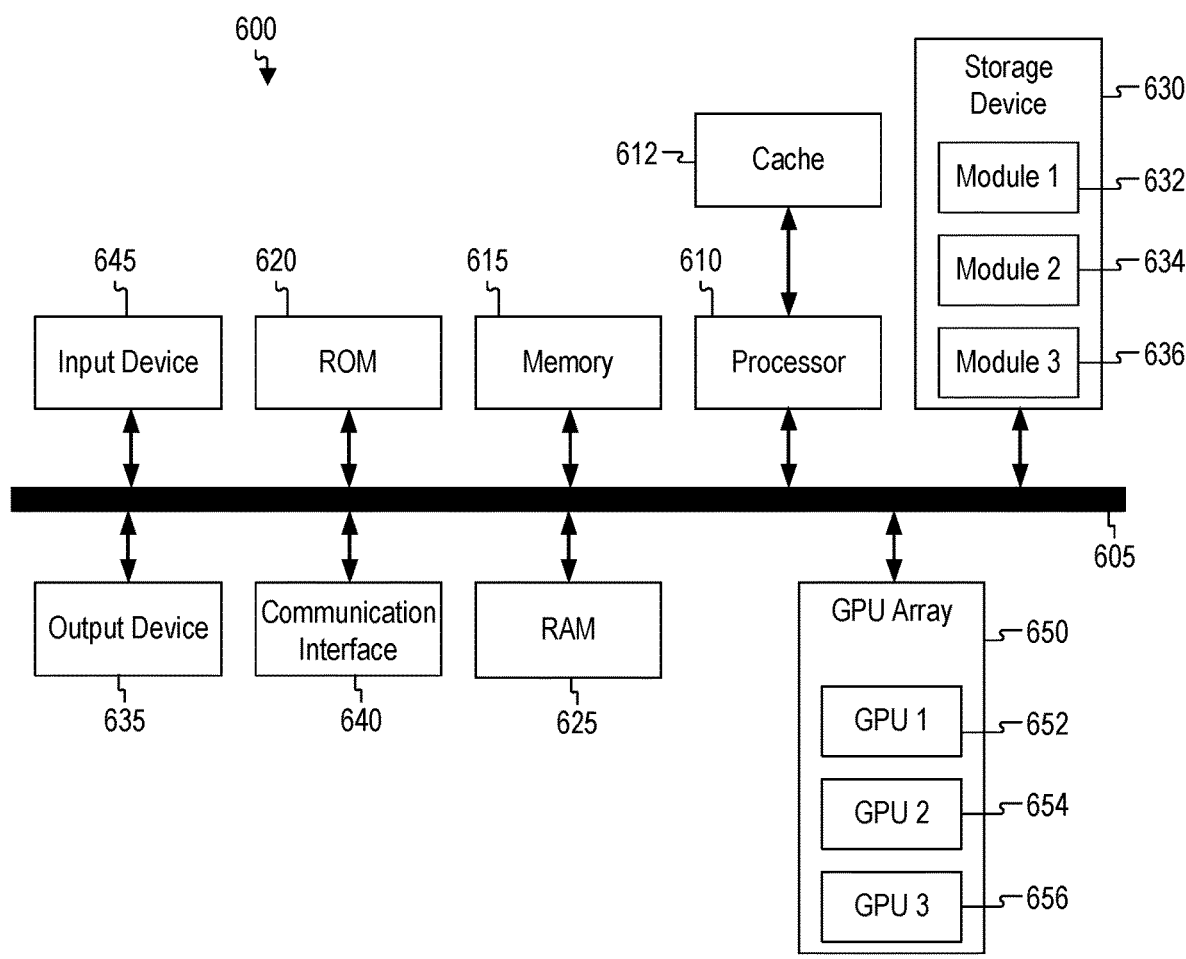
FIG. 6 illustrates an example of a computing system according to an example of the instant disclosure.

A description of an AV management system and a continual learning machine (CLM) for the AV management system, as illustrated in FIGS. 1 and 2, are first disclosed herein. An overview of an offline AV control system for tracking objects is disclosed in FIG. 3 and methods associated with the offline AV control system are disclosed in FIG. 4. An example of incorrect tracking of an object is illustrated in FIGS. 5A and 5B. The discussion then concludes with a brief description of example devices, as illustrated in FIG. 6. These variations shall be described herein as the various embodiments are set forth. The disclosure now turns to FIG. 1.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., light detection and ranging (LIDAR) systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and a high definition (HD) geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.). In some examples, the perception stack can also perceive environmental conditions of the AV 102 such as lighting and weather conditions to facilitate perception tasks and other tasks that consider the environmental conditions such as raining, snow, poor visibility in the human visibility spectrum, and the like.

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources. In some examples, the mapping and localization stack 114 may also receive the environmental conditions associated with the AV 102 to facilitate the determination of the AV's position and orientation.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

FIG. 2 illustrates an example diagram of a CLM 200 that solves uncommon scenarios in a rank-frequency distribution, which may be referred to long-tail prediction problem, in an AV in accordance with some examples. The CLM 200 is a continual loop that iterates and improves based on continual feedback to learn and resolve driving situations experienced by the AV.

The CLM 200 begins with a fleet of AVs that are outfitted with sensors to record a real-world driving scene. In some cases, the fleet of AVs is situated in a suitable environment that represents challenging and diverse situations such as an urban environment to provide more learning opportunities. The AVs record the driving situations into a collection of driving data 210.

The CLM 200 includes an error mining 220 to mine for errors and uses active learning to automatically identify error cases and scenarios having a significant difference between prediction and reality, which are added to a dataset of error instances 230. The error instances are long-tail scenarios that are uncommon and provide rich examples for simulation and training. The error instances 230 store high-value data and prevent storing datasets with situations that are easily resolved.

The CLM 200 also implements a labeling function 240 that includes both automated and manual data annotation of data that is stored in error augmented training data 250 and used for future prediction. The automated data annotation is performed by an ML labeling annotator that uses a neural network trained to identify and label error scenarios in the datasets. Using the ML labeling annotator enables significant scale, cost, and speed improvements that allow the CLM 200 to cover mores scenario of the long tail. The labeling function 240 also includes functionality to allow a human annotator to supplement the ML labeling function. By having both an automated ML labeling function and a manual (human) labeling annotator, the CLM 200 can be populated with dense and accurate datasets for prediction.

The final step of the CLM 200 is model training and evaluation 260. A new model (e.g., a neural network) is trained based on the error augmented training data 250 and the new model is tested extensively using various techniques to ensure that the new model exceeds the performance of the previous model and generalizes well to the nearly infinite variety of scenarios found in the various datasets. The model can also be simulated in a virtual environment and analyzed for performance. Once the new model has been accurately tested, the new model can be deployed in an AV to record driving data 210. The CLM 200 is a continual feedback loop that provides continued growth and learning to provide accurate models for an AV to implement.

In practice, the CLM can handle many uncommon scenarios, but the AV will occasionally need to account for new and infrequency scenarios that would be obvious to a human. For example, an AV may encounter another motorist making an abrupt and sometimes illegal U-turn. The U-turn can be at a busy intersection or could be mid-block, but the U-turn will be a sparse data point as compared to more common behaviors such as moving straight, left turns, right turns, and lane changes. Applying our CLM principles, an initial deployment model may not optimally predict U-turn situations and error situations commonly include U-turns. As the dataset grows and more error scenarios of U-turns are identified, the model can be trained to sufficiently predict a U-turn and allow the AV to accurately navigate this scenario.

The CLM 200 can be applied to any number of scenarios that a human will intuitively recognize including, for example, a K-turn (or a 3-point turn), lane obstructions, construction, pedestrians, animated objects, animals, emergency vehicles, funeral processions, jaywalking, and so forth. The CLM 200 provides a mechanism for continued learning to account for diverse scenarios that are present in the physical world.

Figure 3:
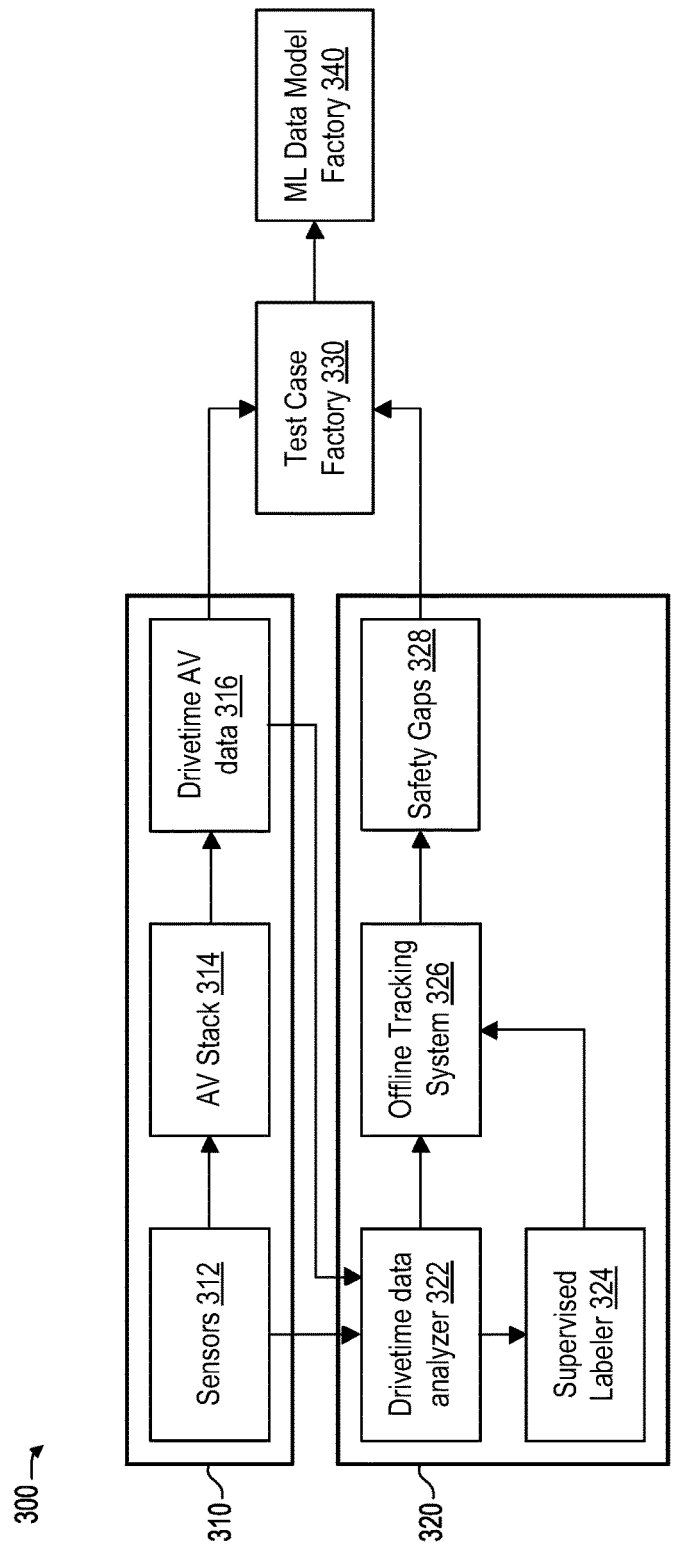
FIG. 3 illustrates an example system for building data models for tracking modules by an AV control system using an offline tracking system in accordance with some examples.

FIG. 3 illustrates an example system 300 for building data models for tracking modules by an AV control system using an offline tracking system in accordance with some examples. The example system includes an online AV control system 310, an offline AV control system 320, a test case factory 330, and an ML data model factory 340. Each of the blocks illustrated in FIG. 3 can be simple or complex systems for performing the described functions and various examples of the necessary devices to implement each of the various components are described below.

The online AV control system 310 may be attached to an AV and configured to sense and detect an environment to navigate the AV through the physical environment. The online AV control system 310 includes sensors 312 and an AV stack 314 for detecting objects, road conditions, as described in detail above with reference to FIG. 1. The AV stack 314 includes a number of stacks described above such as perception stack 112, and the perception stack can include various functions or modules, such as an object detection module and an object tracking module. The online AV control system 310 is configured to generate drivetime AV data 316 that is recorded and may be transmitted to an offline system such as the offline AV control system 320.

The offline AV control system 320 may include one or more various subsystems to evaluate the drive performance of the online AV control system 310, such as evaluating the performance of object tracking in a perception stack 112. In some cases, the offline AV control system 320 can include a drivetime data analyzer 322, a supervised labeler 324, and an offline tracking system 326 that produces safety gaps 328 that identify differences between real-time performance and simulations. In some aspects, the drivetime data analyzer 322 receives raw sensor data produced by the sensors 312 of the AV control system 310 and the drivetime AV data 316 and analyzes the received data to identify data that may need to be reviewed by a human. In some aspects, the drivetime data analyzer 322 may review the labeling of the drivetime AV data 316 and identify potential issues, such as when an object in the AV stack 314 changes an identifier in the drive time AV data 316. In some cases, the AV stack 314 may label data in the drive time AV data 316 for external annotation due to, for example, a changing confidence that varies over time. In one example, the AV control system 310 can initially identify an object with a particular confidence having various kinematic properties (velocity, acceleration, direction, orientation, etc.), but various data changes as the object is being tracked and resulting a varying confidence of that object. As a result, the AV control system 310 may tag the object with a label that can identify further review, either automated (e.g., unsupervised) or manual (e.g., supervised).

Data that is identified by a drivetime data analyzer 322 that is identified for supervised review is provided to a supervised labeler 324. For example, the supervised labeler 324 can be a system for a person to review the various data, such as by replaying a portion of the data, reviewing the various sensor data, and so forth. For example, the supervised labeler 324 may be able to review the images produced by an image sensor included in the sensors 312 to identify various things. The offline AV control system 320 may not be able to accurately perceive long-tail scenarios that are uncommon that a person could understand but an ML data model may have not encountered, such as a person in a wheelchair chasing an animal. The supervised labeler 324 may properly label the data from the online AV control system 310 to provide a ground truth to facilitate model development. An offline tracking system 326 can receive the data from the drivetime data analyzer 322 and the supervised labeler 324 and perform a higher fidelity version of a tracking algorithm. For example, because the offline tracking system 326 does not have a compute budget and any latency restrictions, a higher fidelity object detection algorithm or a higher fidelity object tracking algorithm can be implemented in the offline tracking system 326 to offline tracking data that more accurately captures the drivetime performance without the latency and compute budget restrictions of the online AV control system 310.

The offline tracking system 326 may be configured to compare the drivetime AV data 316 to the offline tracking data and identify safety gaps 328 between the online AV control system 310 and the offline AV control system 320. Safety gaps 328 are any differences between the drivetime AV data 316 and the offline tracking data that can affect decisions made by the AV control system 310. For example, elimination of phantom tracks in the drivetime AV data 316 may improve tracking fidelity in busy environments where a false positive can affect fidelity of tracking other objects.

The drivetime AV data 316 and the safety gaps 328 are provided to a test case factory 330, which is a module or application for designing and constructing test cases to simulate an AV. In addition to test cases, the test case factory 330 uses the information to construct a non-player characteristic (NPC) AI of various objects in the simulation environment. An NPC AI is a reactive model of an object in a simulated environment that identifies how an object reacts to the environment such as an approaching AV.

Errors in the data provided to the test case factory 330 can result in downstream effects associated with the NPC AI. For example, incorrect tracking data from objects can be extracted from a phantom track and that tracking data can then be imputed onto another object in a simulation. Using ML techniques, models can be extracted based on groups of data, and incorrect tracking data can be negatively identified based on the ML techniques. The offline AV control system 320 corrects these errors using the described semi-supervised features to prevent incorrect tracking data from being identified and provided to the test case factory 330. The resulting NPC AI is, therefore, higher quality and more accurately modeled and improves the quality of the AV simulation.

The test cases and various models generated by the test case factory 330 and used to simulate and train various AV data models. For example, the test cases are used to create simulation environments to simulate an AV control system as it navigates a hypothetical situation and the data from that simulation is provided to a data repository for training AV data models in an ML data model factory 340. In some cases, the test case factory 330 is a distributed system of processors or computer systems that execute various software components. For example, the test case factory 330 can include a user interface to allow a person to graphically design a test scenario. The test case factory 330 can also include an autonomous test creation function that selects different attributes to create a randomized or semi-randomized test. A semi-randomized test may be configured based on various parameters a user specifies, such as traffic conditions, pedestrian conditions, weather conditions, etc., to test particular scenarios.

In some examples, the ML data model factory 340 is a distributed system of processors or computer systems that execute various software components to generate an ML model using various ML learning techniques such as regression. The resulting ML data model can receive testing data and evaluation data from the test case factory 330 to construct a data model. The safety gaps 328 can facilitate identification of tracking errors and based on the test cases constructed by the test case factory 330, the ML data model factory 340 can be configured to generate a data model for tracking objects with higher fidelity within the compute budget constraints of the AV control system.

Figure 4:
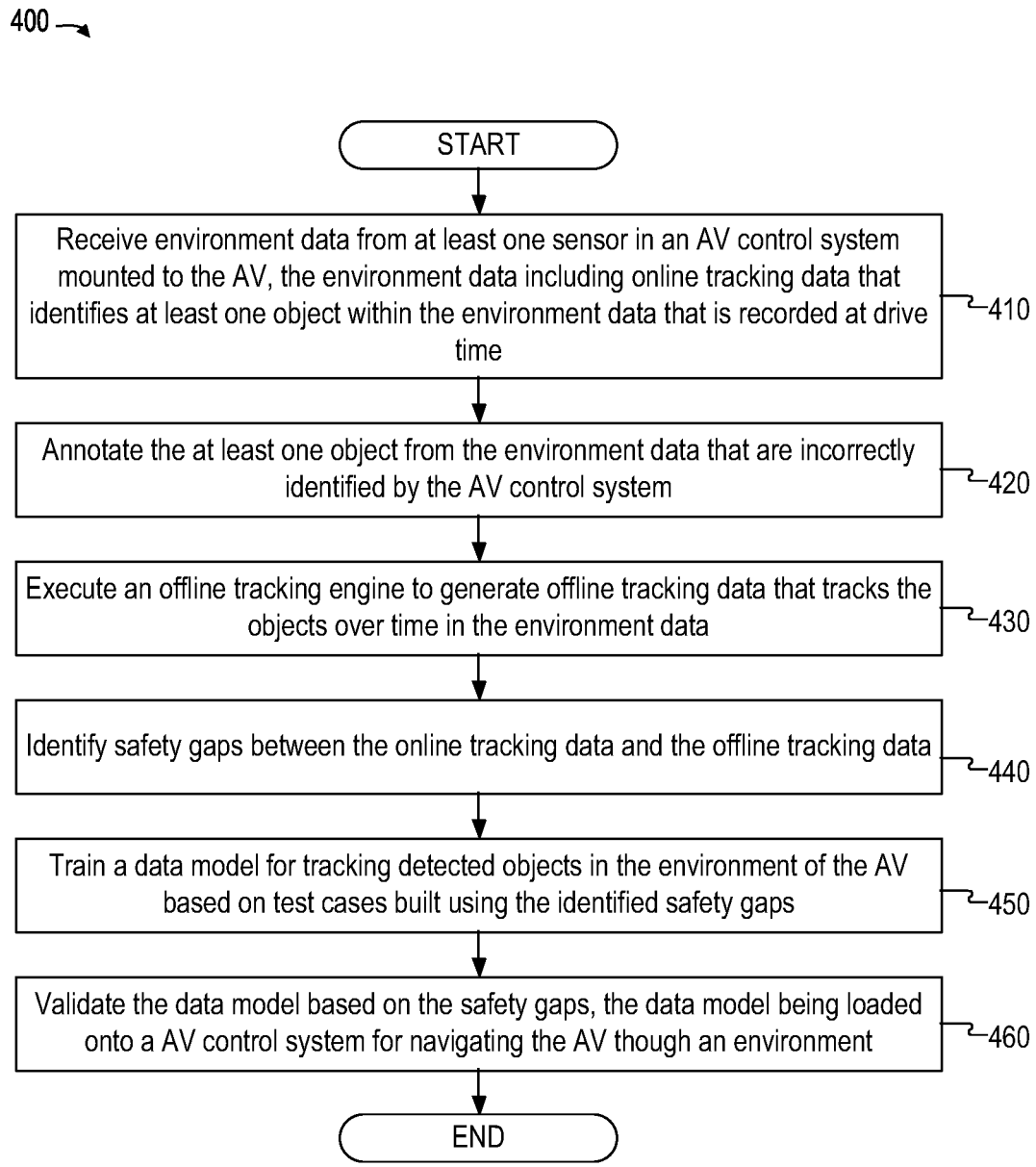
FIG. 4 illustrates a method for improving tracking performance of an AV control system in accordance with some examples.

FIG. 4 illustrates a method 400 for improving tracking performance of an AV control system in accordance with some examples. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

In one illustrative example, the method 400 may be executed by an offline AV control system that is configured to simulate portions of an AV control system. As noted above, the offline AV control system does not have latency and compute budget constraints, and can be implemented with higher fidelity. For example, the offline AV control system may implement a data model having more layers which increases computation time (e.g., increases latency) or an algorithm that is not limited (e.g., by the number of objects to be tracked). The offline AV control system can be implemented by a plurality of computing systems, such as the computing system 600 in FIG. 6. In some cases, the offline AV control system can be implemented by a single computing system 600.

The method 400 begins by receiving environment data from at least one sensor in an AV control system mounted to the AV. For example, a computing system (e.g., computing system 600) can receive environment data from at least one sensor in an AV control system mounted to the AV (e.g., 102) at block 410. The environment data can include online tracking data that identifies at least one object within the environment data that is recorded at drive time. The online tracking data may be identified by an online tracking engine (e.g., of the perception stack 112) at the time the AV was navigating the environment. The AV can include a plurality of sensors that generate and record real-time data such as images from image sensors, 3D point cloud data from a LIDAR, and 2D point cloud data from a radar.

The method 400 may include annotating (e.g., by the computing system 600) the at least one object from the environment data that are incorrectly identified by the AV control system at block 410. The annotation may be unsupervised to identify any gaps between a lower fidelity version of the online AV control system and the higher fidelity version of the offline AV control system. In some cases, a human may validate the labels using a user interface, or various labels can be selected to permit a human to limit a human review.

In some cases, the method can identify labels that require further annotation or review. For example, the method may detect a condition in the environment data that changes a state of the at least one object in the AV control system. For example, a condition can be identification of incorrect kinematics associated with a potential object such as movement with no change in position, etc. In another example, a condition can be identification of a changing identifier associated with an object.

After annotation, at block 420, the method 400 can include executing (e.g., by the computing system 600) an offline tracking engine to generate offline tracking data that tracks the objects over time in the environment data.

At block 430, the method 400 can include identifying (e.g., by the computing system 600) safety gaps between the online tracking data and the offline tracking data. In some cases, the identifying can be performed using various parts of an offline AV control system such as a perception stack for identifying and tracking objects. For example, an offline perception engine can have a higher fidelity than a perception engine of the online AV control system and can more accurately identify objects and their movement. The offline perception engine may include an offline tracking engine that is configured to track objects but with a higher fidelity than the online tracking engine.

The method 400 includes identifying (e.g., by the computing system 600) safety gaps between the online tracking data and the offline tracking data at block 440.

At block 450, the method 400 includes training (e.g., by the computing system 600) a data model for tracking detected objects in the environment of the AV based on test cases built using the identified safety gaps. As described above, a system may be configured to construct a test case for an AV simulator that executes a function corresponding to the AV control system and train a data model for tracking objects in the AV control system using the test case. The system can also identify an NPC of an object in the environment data and determine reaction information of the NPC to the AV based on the environment data and the offline tracking data. In this case, the NPC can be configured to react to a simulated AV in the AV simulator based on the reaction information.

The training of a data model for tracking detected objects in the environment of the AV can be based on a compute budget of the AV for tracking objects in the environment. For example, a number of layers of the data model, an architecture of the data model, and so forth, can be inputs into the training system.

At block 460, the method includes validating (e.g., by the computing system 600) the data model based on the safety gaps. In this manner, the data model for the online tracking engine can be constrained to operate within predefined constraints (e.g., at design time) for navigating the AV through an environment.

FIGS. 5A and 5B are visual illustrations of a user interface configured to display simulation or drivetime data from one or more sensors. In some aspects, a user interface can be configured to fuse different sensor data to identify error conditions, false positives, and false negatives. For example, a user interface may be configured to use the drivetime AV data 316 that is annotated by a human to provide a ground truth and simulation data to identify gaps in a tracking module. The illustrations in FIGS. 5A and 5B illustrate an example scenario where the user interface presents a false positive object that can cause issues with the AV control system.

FIG. 5A illustrates that the AV 500 is navigating a turn in a street and detects an object 510, but the AV control system determines that the object 510 is stationary and therefore not tracked. The AV control system can also detect object 520 and object 530. A bounding region 525 is applied to object 520 based to identify kinematics of the object 520, which appears to be stationary. A bounding region 535 is also applied to object 530, which appears to move away from the AV 500.

FIG. 5B illustrates that the AV 500, moments later into the turn and the AV control system, determines that the object 530 has moved. However, as the AV 500 has rotated around the object 510, the object 510 may have changed shape because characteristics of the object 510 have changed in shape. As a result, the AV control system may inadvertently detect kinematics associated with the object and identify a bounding region 540 that intersects with the AV 500. As a result, the AV 500 could potentially make an incorrect assumption that a collision is imminent and may determine to take evasive action. In this case, the AV control system may change an object identifier of the object 510. The changing of an object identifier can be a flag to indicate a tracking error of the AV control system.

In some cases, other aspects can be identified to identify incorrect tracking information of objects. For example, incorrect kinematics of an object over time, or failure to correspond to a prediction, can indicate that an object is incorrectly identified and tracked. Based on the identified errors in the tracking data, the higher fidelity tracking of the offline AV control system can identify safety gaps that the online tracking system was unable to identify or incorrectly identified. Allowing human annotation and a semi-supervised approach can improve test case development and, in turn, improve the training of ML data models for the AV.

FIG. 6 shows an example of computing system 600, which can be for example any computing device for training or executing a neural network, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, RAMs, ROM, and/or some combination of these devices.

The storage device 630 can include software services, servers, services, etc., when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

The computing system 600 can also include a graphical processing unit (GPU) array 650 or any similar processor for performing massively complex and parallel mathematical operations such as simulations, games, neural network training, and so forth. The GPU array 650 includes at least one GPU and is illustrated to have three GPUs comprising GPU 652, GPU 654, and GPU 656. However, the GPU array 650 can be any number of GPUs. In some examples, the GPU core can be integrated into a die of the processor 610.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1. A method for tracking objects in an environment that an autonomous vehicle (AV) is navigating, comprising: receiving environment data from at least one sensor in an AV control system mounted to the AV, the environment data including online tracking data that identifies at least one object within the environment data that is recorded at drive time; annotating the at least one object from the environment data that are incorrectly identified by the AV control system; executing an offline tracking engine to generate offline tracking data that tracks the objects over time in the environment data; and identifying safety gaps between the online tracking data and the offline tracking data.

Aspect 2. The method of Aspect 1, further comprising: displaying a user interface for annotating the at least one object.

Aspect 3. The method of any of Aspects 1 to 2, wherein further comprising: detecting a condition in the environment data that changes a state of the at least one object in the AV control system, wherein the condition comprises identification of incorrect kinematics associated with a potential object or identification of a changing identifier.

Aspect 4. The method of any of Aspects 1 to 3, wherein the online tracking data is identified by an online tracking engine of the AV at the time the AV was navigating the environment, wherein the online tracking engine and the offline tracking system have a different tracking fidelity.

Aspect 5. The method of any of Aspects 1 to 4, further comprising: identifying objects to track in the environment data based on an offline perception engine for identifying the objects, wherein the offline perception engine has a higher fidelity than a perception engine of the AV control system.

Aspect 6. The method of any of Aspects 1 to 5, further comprising: constructing a test case for an AV simulator that executes a function corresponding to the AV control system; and training a data model for tracking objects in the AV control system using the test case.

Aspect 7. The method of any of Aspects 1 to 6, identifying a non-player characteristic (NPC) of an object in the environment data and determining reaction information of the NPC to the AV based on the environment data and the offline tracking data, wherein the NPC reacts to a simulated AV in the AV simulator based on the reaction information.

Aspect 8. The method of any of Aspects 1 to 7, wherein the at least one sensor includes at least one of a light detection and ranging sensor (LIDAR), a radar, or an image sensor.

Aspect 9. The method of any of Aspects 1 to 8, further comprising: training a data model for tracking detected objects in the environment of the AV based on test cases derived from the offline tracking data and the safety gaps, wherein the data model is configured based on a compute budget of the AV for tracking objects in the environment.

Aspect 10. The method of any of Aspects 1 to 9, further comprising: validating the data model based on the safety gaps, wherein the data model is loaded onto an AV control system for navigating the AV through an environment.

Aspect 11: A system for tracking objects in an environment that an autonomous vehicle (AV) is navigating includes a storage (implemented in circuitry) configured to store instructions and a processor. The processor configured to execute the instructions and cause the processor to: receive environment data from at least one sensor in an AV control system mounted to the AV, the environment data including online tracking data that identifies at least one object within the environment data that is recorded at drive time; annotate the at least one object from the environment data that are incorrectly identified by the AV control system; execute an offline tracking engine to generate offline tracking data that tracks the objects over time in the environment data; and identify safety gaps between the online tracking data and the offline tracking data.

Aspect 12: The system of Aspect 11, wherein the processor is configured to execute the instructions and cause the processor to: display a user interface for annotating the at least one object.

Aspect 13: The system of any of Aspects 11 to 12, wherein the processor is configured to execute the instructions and cause the processor to: detect a condition in the environment data that changes a state of the at least one object in the AV control system, wherein the condition comprises identification of incorrect kinematics associated with a potential object or identification of a changing identifier.

Aspect 14: The system of any of Aspects 11 to 13, wherein the online tracking data is identified by an online tracking engine of the AV at the time the AV was navigating the environment, and wherein the online tracking engine and the offline tracking system have a different tracking fidelity.

Aspect 15: The system of any of Aspects 11 to 14, wherein the processor is configured to execute the instructions and cause the processor to: identify objects to track in the environment data based on an offline perception engine for identifying the objects, wherein the offline perception engine has a higher fidelity than a perception engine of the AV control system.

Aspect 16: The system of any of Aspects 11 to 15, wherein the processor is configured to execute the instructions and cause the processor to: construct a test case for an AV simulator that executes a function corresponding to the AV control system; and train a data model for tracking objects in the AV control system using the test case.

Aspect 17: The system of any of Aspects 11 to 16, wherein the processor is configured to execute the instructions and cause the processor to: identify a non-player characteristic (NPC) of an object in the environment data and determine reaction information of the NPC to the AV based on the environment data and the offline tracking data, wherein the NPC reacts to a simulated AV in the AV simulator based on the reaction information.

Aspect 18: The system of any of Aspects 11 to 17, wherein the at least one sensor includes at least one of a light detection and ranging sensor (LIDAR), a radar, or an image sensor.

Aspect 19: The system of any of Aspects 11 to 18, wherein the processor is configured to execute the instructions and cause the processor to: train a data model for tracking detected objects in the environment of the AV based on test cases derived from the offline tracking data and the safety gaps, wherein the data model is configured based on a compute budget of the AV for tracking objects in the environment.

Aspect 20: The system of any of Aspects 11 to 19, wherein the processor is configured to execute the instructions and cause the processor to: validate the data model based on the safety gaps, wherein the data model is loaded onto an AV control system for navigating the AV through an environment.

Aspect 21: A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: receive environment data from at least one sensor in an AV control system mounted to the AV, the environment data including online tracking data that identifies at least one object within the environment data that is recorded at drive time; annotate the at least one object from the environment data that are incorrectly identified by the AV control system; execute an offline tracking engine to generate offline tracking data that tracks the objects over time in the environment data; and identify safety gaps between the online tracking data and the offline tracking data.

Aspect 22: The computer readable medium of Aspect 21, wherein the processor is configured to execute the computer readable medium and cause the processor to: display a user interface for annotating the at least one object.

Aspect 23: The computer readable medium of any of Aspects 21 to 22, wherein the processor is configured to execute the computer readable medium and cause the processor to: detect a condition in the environment data that changes a state of the at least one object in the AV control system, wherein the condition comprises identification of incorrect kinematics associated with a potential object or identification of a changing identifier.

Aspect 24: The computer readable medium of any of Aspects 21 to 23, wherein the online tracking data is identified by an online tracking engine of the AV at the time the AV was navigating the environment, wherein the online tracking engine and the offline tracking system have a different tracking fidelity.

Aspect 25: The computer readable medium of any of Aspects 21 to 24, wherein the processor is configured to execute the computer readable medium and cause the processor to: identify objects to track in the environment data based on an offline perception engine for identifying the objects, wherein the offline perception engine has a higher fidelity than a perception engine of the AV control system.

Aspect 26: The computer readable medium of any of Aspects 21 to 25, wherein the processor is configured to execute the computer readable medium and cause the processor to: construct a test case for an AV simulator that executes a function corresponding to the AV control system; and train a data model for tracking objects in the AV control system using the test case.

Aspect 27: The computer readable medium of any of Aspects 21 to 26, wherein the processor is configured to execute the computer readable medium and cause the processor to: identify a non-player characteristic (NPC) of an object in the environment data and determine reaction information of the NPC to the AV based on the environment data and the offline tracking data, wherein the NPC reacts to a simulated AV in the AV simulator based on the reaction information.

Aspect 28: The computer readable medium of any of Aspects 21 to 27, wherein the at least one sensor includes at least one of a light detection and ranging sensor (LIDAR), a radar, or an image sensor.

Aspect 29: The computer readable medium of any of Aspects 21 to 28, wherein the processor is configured to execute the computer readable medium and cause the processor to: train a data model for tracking detected objects in the environment of the AV based on test cases derived from the offline tracking data and the safety gaps, wherein the data model is configured based on a compute budget of the AV for tracking objects in the environment. Aspect 30: The computer readable medium of any of Aspects 21 to 29, wherein the processor is configured to execute the computer readable medium and cause the processor to: validate the data model based on the safety gaps, wherein the data model is loaded onto an AV control system for navigating the AV through an environment.

What is claimed is:

1. A method for tracking objects in an environment that an autonomous vehicle (AV) is navigating, comprising:
   receiving environment data from at least one sensor in an AV control system mounted to the AV, the environment data including online tracking data that identifies at least one object within the environment data that is recorded at drive time;
   annotating the at least one object from the environment data that are incorrectly identified by the AV control system;
   executing an offline tracking engine to generate offline tracking data that tracks the objects over time in the environment data;
   identifying safety gaps between the online tracking data and the offline tracking data;
   training a data model for tracking detected objects in the environment of the AV based on test cases derived from the offline tracking data and the safety gaps, wherein the data model is configured based on a compute budget of the AV for tracking objects in the environment; and validating the data model based on the safety gaps, wherein the data model is loaded onto an AV control system for navigating the AV through an environment.

2. The method of claim 1, further comprising: displaying a user interface for annotating the at least one object.

3. The method of claim 1, wherein further comprising: detecting a condition in the environment data that changes a state of the at least one object in the AV control system, wherein the condition comprises identification of incorrect kinematics associated with a potential object or identification of a changing identifier.

4. The method of claim 1, wherein the online tracking data is identified by an online tracking engine of the AV at the time the AV was navigating the environment, wherein the online tracking engine and the offline tracking system have a different tracking fidelity.

5. The method of claim 1, further comprising:
identifying objects to track in the environment data based on an offline perception engine for identifying the objects, wherein the offline perception engine has a higher fidelity than a perception engine of the AV control system.

6. The method of claim 1, further comprising:
constructing a test case for an AV simulator that executes a function corresponding to the AV control system; and
training a data model for tracking objects in the AV control system using the test case.

7. The method of claim 1, identifying a non-player characteristic (NPC) of an object in the environment data and determining reaction information of the NPC to the AV based on the environment data and the offline tracking data, wherein the NPC reacts to a simulated AV in the AV simulator based on the reaction information.

8. The method of claim 1, wherein the at least one sensor includes at least one of a light detection and ranging sensor (LIDAR), a radar, or an image sensor.

9. A system for tracking objects in an environment that an autonomous vehicle (AV) is navigating, comprising:
a storage configured to store instructions; a processor configured to execute the instructions and cause the processor to:
receive environment data from at least one sensor in an AV control system mounted to the AV, the environment data including online tracking data that identifies at least one object within the environment data that is recorded at drive time;
annotate the at least one object from the environment data that are incorrectly identified by the AV control system;
execute an offline tracking engine to generate offline tracking data that tracks the objects over time in the environment data;
identify safety gaps between the online tracking data and the offline tracking data;
train a data model for tracking detected objects in the environment of the AV based on test cases derived from the offline tracking data and the safety gaps, wherein the data model is configured based on a compute budget of the AV for tracking objects in the environment; and
validate the data model based on the safety gaps, wherein the data model is loaded onto an AV control system for navigating the AV through an environment.

10. The system of claim 9, wherein the processor is configured to execute the instructions and cause the processor to: display a user interface for annotating the at least one object.

11. The system of claim 9, wherein the processor is configured to execute the instructions and cause the processor to:
detect a condition in the environment data that changes a state of the at least one object m the AV control system, wherein the condition comprises identification of incorrect kinematics associated with a potential object or identification of a changing identifier.

12. The system of claim 9, wherein the online tracking data is identified by an online tracking engine of the AV at the time the AV was navigating the environment, wherein the online tracking engine and the offline tracking system have a different tracking fidelity.

13. The system of claim 9, wherein the processor is configured to execute the instructions and cause the processor to:
identify objects to track in the environment data based on an offline perception engine for identifying the objects, wherein the offline perception engine has a higher fidelity than a perception engine of the AV control system.

14. The system of claim 9, wherein the processor is configured to execute the instructions and cause the processor to:
construct a test case for an AV simulator that executes a function corresponding to the AV control system; and
train a data model for tracking objects in the AV control system using the test case.

15. The system of claim 9, wherein the processor is configured to execute the instructions and cause the processor to: identify a non-player characteristic (NPC) of an object in the environment data and determine reaction information of the NPC to the AV based on the environment data and the offline tracking data, wherein the NPC reacts to a simulated AV in the AV simulator based on the reaction information.

16. A non-transitory computer readable medium comprising instructions, the instructions, when executed by a computing system, cause the computing system to:
receive environment data from at least one sensor in an AV control system mounted to the AV, the environment data including online tracking data that identifies at least one object within the environment data that is recorded at drive time;
annotate the at least one object from the environment data that are incorrectly identified by the AV control system;
execute an offline tracking engine to generate offline tracking data that tracks the objects over time in the environment data;
identify safety gaps between the online tracking data and the offline tracking data;
train a data model for tracking detected objects in the environment of the AV based on test cases derived from the offline tracking data and the safety gaps, wherein the data model is configured based on a compute budget of the AV for tracking objects in the environment; and
validate the data model based on the safety gaps, wherein the data model is loaded onto an AV control system for navigating the AV through an environment.

* * * * *